US 10,878,083 B2

(12) United States Patent
Hlaing et al.

(10) Patent No.: US 10,878,083 B2
(45) Date of Patent: Dec. 29, 2020

(54) MOBILE DEVICE HAVING TRUSTED EXECUTION ENVIRONMENT

(71) Applicant: GEMALTO SA, Meudon (FR)

(72) Inventors: Min Hlaing, Meudon (FR); SM Sohiduzzaman SK Abdul Aziz, Meudon (FR); Sriram Ramachandran, Meudon (FR); Véronique Charpeignet, Meudon (FR); Patrice Angelini, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 27 days.

(21) Appl. No.: 15/781,427

(22) PCT Filed: Dec. 9, 2016

(86) PCT No.: PCT/EP2016/080527
§ 371 (c)(1),
(2) Date: Jun. 4, 2018

(87) PCT Pub. No.: WO2017/098024
PCT Pub. Date: Jun. 15, 2017

(65) Prior Publication Data
US 2019/0005229 A1 Jan. 3, 2019

(30) Foreign Application Priority Data

Dec. 11, 2015 (EP) ..................................... 15306989

(51) Int. Cl.
*G06F 21/53* (2013.01)
*G06F 8/61* (2018.01)
(Continued)

(52) U.S. Cl.
CPC .............. *G06F 21/53* (2013.01); *G06F 8/61* (2013.01); *G06F 9/445* (2013.01); *G06F 21/14* (2013.01);
(Continued)

(58) Field of Classification Search
None
See application file for complete search history.

(56) References Cited

U.S. PATENT DOCUMENTS 8,712,041 B2 * 4/2014 Lee .................... H04L 9/0618
380/44
10,050,964 B2 * 8/2018 Al-Kadi ............... H04L 63/061
(Continued)

FOREIGN PATENT DOCUMENTS

CN 104765612 A 7/2015
WO WO2012083221 A1 6/2012

OTHER PUBLICATIONS

Guo Nan, et al: "Random orable-based anonymous credential system for efficient attributes proof on smart devices", Soft Computing, Springer Verlag, Berlin, DE, vol. 20, No. 5, May 22, 2015, pp. 1781-1791, XP035806183, ISSN: 1432-7643, DOI: 10.1007/S00500-015-1704-7 [retrieved on May 22, 2015] see sections 4 and 5.
(Continued)

*Primary Examiner* — Taghi T Arani
*Assistant Examiner* — Joshua Raymond White
(74) *Attorney, Agent, or Firm* — The Jansson Firm; Pehr B. Jansson

(57) ABSTRACT

A mechanism for securing a mobile app for execution on a mobile device. The mechanism includes loading a non-trusted portion of the mobile app from a non-trusted application provider onto the mobile device, operating a key provisioning server to generate keys associated with a
(Continued)

trusted execution environment, transmitting the keys associated with the trusted execution environment to the mobile device and to a key directory server, authenticate the mobile device, and upon authenticating the mobile device, transmitting a trusted portion of the mobile app including a trusted application to the mobile device, and installing the trusted portion of the mobile app on the mobile device thereby providing a trusted execution environment. Other systems and methods are disclosed.

12 Claims, 15 Drawing Sheets

(51) Int. Cl.
| | | |
|---|---|---|
| *G06F 9/445* | (2018.01) | |
| *G06F 21/55* | (2013.01) | |
| *G06F 21/74* | (2013.01) | |
| *H04L 29/06* | (2006.01) | |
| *G06F 21/72* | (2013.01) | |
| *G06F 21/14* | (2013.01) | |
| *H04W 12/04* | (2009.01) | |
| *H04W 12/06* | (2009.01) | |
| *H04L 9/08* | (2006.01) | |

(52) U.S. Cl.
CPC .......... *G06F 21/554* (2013.01); *G06F 21/725* (2013.01); *G06F 21/74* (2013.01); *H04L 9/0866* (2013.01); *H04L 9/0894* (2013.01); *H04L 63/0876* (2013.01); *H04W 12/0401* (2019.01); *H04W 12/0609* (2019.01); *G06F 2221/2149* (2013.01); *H04L 2209/04* (2013.01); *H04L 2209/16* (2013.01)

(56) References Cited

U.S. PATENT DOCUMENTS

| | | | |
|---|---|---|---|
| 2003/0037237 A1* | 2/2003 | Abgrall | H04L 63/123 713/166 |
| 2012/0159148 A1 | 6/2012 | Behren et al. | |
| 2013/0347064 A1* | 12/2013 | Aissi | G06F 21/44 726/2 |
| 2014/0040622 A1 | 2/2014 | Richard et al. | |
| 2015/0229471 A1* | 8/2015 | Nair | H04L 9/0822 713/171 |
| 2016/0134660 A1* | 5/2016 | Ponsini | G06F 8/61 726/1 |
| 2016/0371496 A1* | 12/2016 | Sell | G06F 12/14 |
| 2017/0063975 A1* | 3/2017 | Prakash | H04L 67/1002 |

OTHER PUBLICATIONS

Abhilasha Bhargav-Spantzel et al: "Multifactor Identity Verification Using Aggregated Proof of Knowledge", IEEE Transactions on Systems, Man, and Cybernetics: Part C:Applications and Reviews, IEEE Service Center, Piscataway, NJ, US, vol. 40, No. 4, Jul. 1, 2010, pp. 372-383, XP011346104, ISSN: 1094-6977, DOI: 10.1109/TSMCC. 2010.2045755 sections III and IV.
PCT/EP2016/080518, International Search Report, dated Feb. 2, 2017, European Patent Office, P.B. 5818 Patentlaan 2 NL—2280 HV Rijswijk.
PCT/EP2016/080518, Written Opinion of the International Searching Authority, dated Feb. 2, 2017, European Patent Office, D-80298 Munich.
PCT/EP2016/080527, International Search Report, dated Mar. 23, 2017, European Patent Office, P.B. 5818 Patentlaan 2 NL—2280 HV Rijswijk.
PCR/EP2016/080527, Written Opinion of the International Searching Authority, dated Mar. 23, 2017, European Patent Office, P.B. 5818 Patentlaan 2 NL—2280 HV Rijswijk.

* cited by examiner

MOBILE DEVICE HAVING TRUSTED EXECUTION ENVIRONMENT

BACKGROUND OF THE INVENTION

The present invention relates generally to mobile devices, and more particularly to provisioning mobile devices with trusted execution environments and the management of security of trusted applications loaded and executed on mobile devices throughout the life cycle of such trusted applications.

In the brief history of mobile communications devices, the devices have quickly evolved from being primarily or even exclusively dedicated to mobile telephone communication to being extraordinarily powerful multi-purpose devices. With recent technical developments it is now possible to use mobile devices, e.g., mobile telephones, for disparate applications such as payment, transportation ticketing, loyalty programs, bank account access, physical access control to buildings or offices, etc. Near Field Communication is one enabling technology that makes these new functions possible on mobile devices.

Security is an import criteria for many of these functions; for example, it is often a necessary factor for a successful commercial program to be able to have confidence that mobile transactions are secure and not easily intercepted by attackers wishing to steal information such as account numbers, transaction patterns, personal data, or cryptographic keys used in making the transactions secure.

Trusted Execution Environments (TEE), which are secure areas of the main processor of a mobile device, provide one mechanism for enhanced security of applications executing on certain mobile devices. Trusted Execution Environments are implemented in hardware. A TEE provides an isolated execution environment for trusted applications, thereby, providing for a higher level of security.

GlobalPlatform™ publishes specifications for secure computing on secure chip technology, including providing a standardized Trusted Execution Environment (TEE), which includes a secure area in the main processor which ensures that sensitive data is stored, processed and protected in a trusted environment. GlobalPlatform provides for a standard applications program interface (API) through which application programs, also known as apps, may access secure functionality provided by the secure processor areas of GlobalPlatform Trusted Execution Environments.

One example of a commercial TEE solution is the ARM TrustZone technology from ARM Ltd., Cambridge, UK. ARM, TrustZone, www.arm.com. The TrustZone technology is tightly integrated into processors while extending the secure environment outside of the processor, e.g., to peripherals such as memory and crypto blocks, to allow for system-wide security to security aware applications, e.g., Trusted Applications.

Unfortunately, many mobile devices are not equipped with technology that implements trusted execution environments in the hardware. However, that does not reduce the need for providing secure computing functionality in the manner of a Trusted Execution Environment on such more limited devices. Otherwise, applications executing on the device are vulnerable to malware and a wide range of possible attacks that may reveal secret information of the user of the device or cause economic losses to the user or to service providers.

From the foregoing it will be apparent that there is still a need for an improved method to provide a flexible, convenient and yet powerful mechanism to provide for a secure trusted execution environment to devices not equipped with secure areas of implemented in the hardware of their processors. Ideally such a solution is compatible with the hardware implementations of trusted execution environment solutions, e.g., as provided by GlobalPlatform, so that apps can be developed that execute on processor-based trusted execution environments as well as on an alternative mechanism that does not require such hardware.

From the foregoing it will be apparent that there is still a need for an improved method to provide the security enhancements commensurate with a hardware implemented TEE on mobile devices that lack the specific hardware features of a hardware TEE.

SUMMARY OF THE INVENTION

Aspects of the embodiments of the present invention relate in general to a method for securing a mobile application for execution on a mobile device, comprising:
the mobile device being configured to:
load a non-trusted portion of the mobile application from a non-trusted application provider onto the mobile device;
load a trusted portion of the mobile application from a trusted application provider into the mobile device;
install the trusted portion of the mobile application on the mobile device thereby providing a trusted execution environment.

According to an embodiment of the present invention, the loading of the trusted portion of the mobile application into the mobile device comprises the following steps:
the mobile application generates a trusted execution environment id TEE ID from an identifier of the mobile application and a device fingerprint of the mobile device; said generated a trusted execution environment id TEE ID being transmitted by the mobile application to a key provisioning server;
operating the key provisioning server to generate keys to be associated with the trusted execution environment id TEE ID and transmitting to a key director the trusted execution environment id TEE ID and the generated keys and to the mobile device the generated keys;
the trusted application provider being configured to receive the TEE ID and a hash of the TEE ID computed from the generated keys sent by the mobile device and to authenticate the mobile device through the key director server;
upon successful authentication of the mobile device, operating the trusted application provider to transmit the trusted portion of the mobile application including a trusted application to the mobile device; and the mobile device being configured to install the trusted portion of the mobile application on the mobile device thereby providing a trusted execution environment.

According to an embodiment of the present invention, the non-trusted portion of the mobile application comprises:
a client application executable in a rich execution environment of the mobile device; and
a trusted application interpreter for an instruction set in which trusted applications may be implemented.

According to an embodiment of the present invention, the trusted application is implemented in the instruction set interpretable by the trusted application interpreter.

According to an embodiment of the present invention, the keys associated with the mobile application include a whitebox key "WBC key" and an initial pin encryption key "IPEK" and wherein the method further comprises encrypting the IPEK using the WBC key prior to transmitting the keys associated with the mobile application to the mobile device and wherein the encrypted version of the IPEK is transmitted to the mobile device.

According to an embodiment of the present invention, the trusted portion of the mobile application is encrypted with a session key generated from the initial pin encryption key "IPEC" before transmission by the trusted server provider to the mobile device.

According to an embodiment of the present invention, the non-trusted portion of the mobile application includes an application program interface implementing functionality analogous to a hardware implementation of a trusted execution environment.

According to an embodiment of the present invention, the method for securing the mobile application for execution on the mobile device comprises the following steps:

associating the trusted application with a trusted secure storage; and storing an initial random secret in secure storage of the mobile device; and on each access of data in the secure storage of the trusted application, generating a secure storage data key "TA_SK" for encrypting data stored in the trusted storage associated with the trusted application using an initial random secret "IRS", a device finger print, and a unique id "UUID" for the trusted application.

According to an embodiment of the present invention, the method for securing the mobile application for execution on the mobile device comprises the following steps:

during the execution of a trusted application:

determining a one-time runtime key associated with that particular execution of the trusted application;

when storing a quantity into the runtime memory used by the trusted application during that particular execution of the trusted application, masking the quantity using the one-time runtime key; and when retrieving a quantity from the runtime memory used by the trusted application during that particular execution of the trusted application, unmasking the quantity using the one-time runtime key.

According to an embodiment of the present invention, the method for securing the mobile application for execution on the mobile device comprises the following steps:

on a first run of a trusted application having a compiled form for execution or interpretation, compute a first value based on the compiled form of the trusted application and storing that value based on the compiled form of the trusted application;

upon subsequent executions of the trusted application, perform the same computation based on the compiled form of the trusted application to produce a second value based on the compiled form of the trusted application, compare the first and second value, and take a corrective action if the first and second values are not the same.

According to an embodiment of the present invention, the method for securing the mobile application for execution on the mobile device further comprises defending against a potential time-shift attack by:

determining expected execution time for particular instructions of the mobile application on the first execution of the software trusted execution environment;

store the expected execution time for said certain instructions;

during subsequent execution of the software trusted execution environment:

track the instruction count;

periodically fetch the system clock;

compute the expected execution time from the current instruction count;

compare the current system clock against the expected execution time; and if the comparison indicates an unacceptable deviation, take a corrective action.

According to an embodiment of the present invention, the particular instructions are calls to functions of an application program interface.

According to an embodiment of the present invention, the method for securing the mobile application for execution on the mobile device comprises the following steps:

amend a critical portion of a trusted application with a dummy code section that has a plurality of loops each of which may be executed as a short loop or as a long loop;

assigning a plurality of inspection points in the dummy code section and adjacent to said critical portion of the trusted application;

on execution of the trusted application determining an execution path through the dummy code wherein the execution path executes a defined number of short and long loops;

determining expected arrival times for each inspection point; and upon arrival of an inspection point, comparing the actual arrival time against the expected arrival time and taking a corrective action if the deviation between the actual arrival time and the expected arrival time is beyond a predetermined threshold.

DETAILED DESCRIPTION OF THE INVENTION

Figure 1:
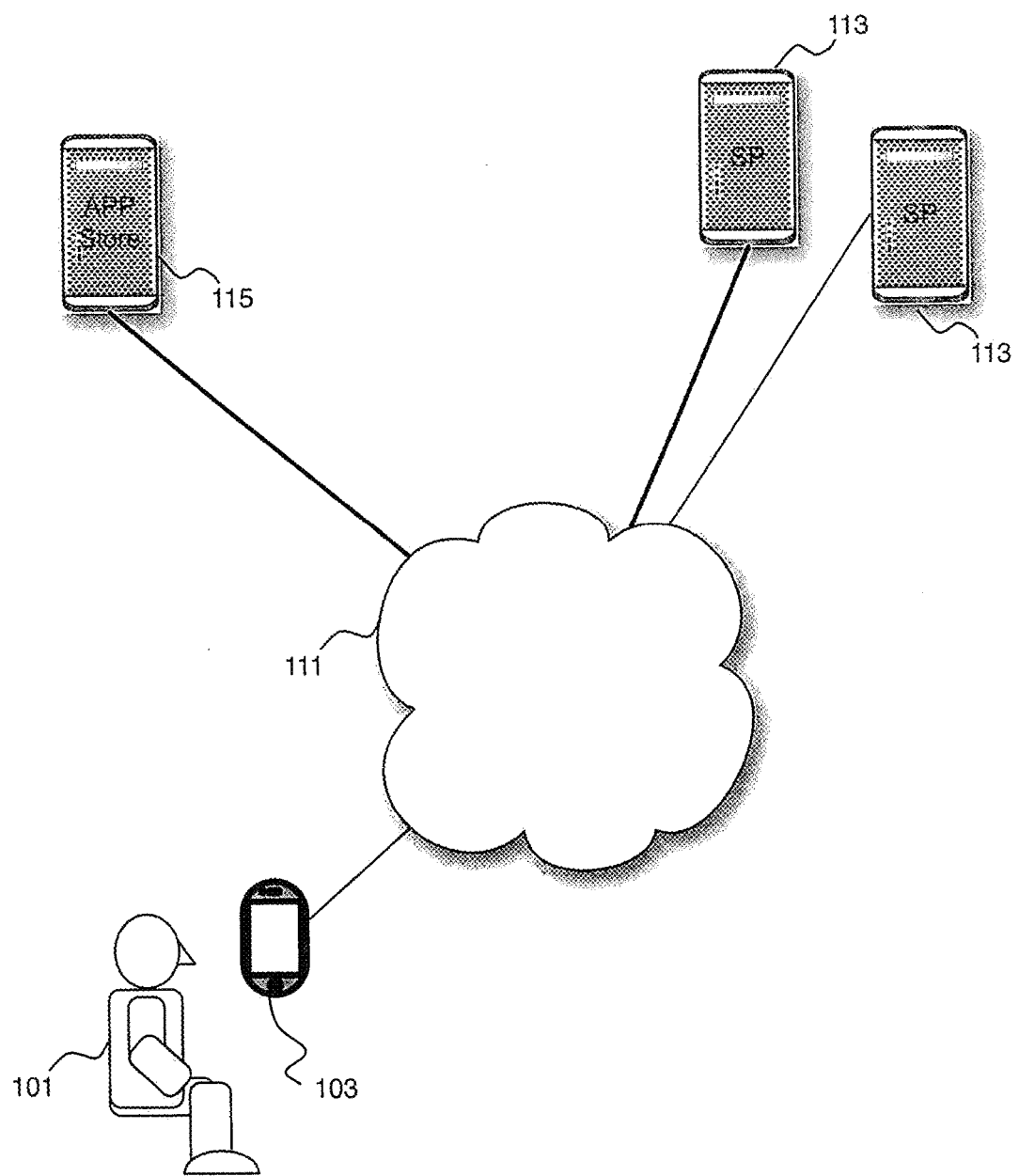
FIG. 1 is a block diagram illustrating an environment in which mobile applications may be loaded onto a mobile computation device from an App Store and used to access services from a service provider (SP).

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined by the appended claims, appropriately interpreted. In the drawings, like numerals refer to the same or similar functionality throughout the several views.

In an embodiment of the invention, a technology is presented that provides a mechanism by which a trusted execution environment (TEE) is made available on mobile devices that are not outfitted with hardware mechanisms to support a trusted execution environment. The presented mechanism allows for trusted applications to be developed that may be trusted by end-users and service providers alike while being developed against application programmer interfaces of standard hardware supported trusted execution environments thereby allowing for easy portability of applications developed for the mechanism herein described to such hardware based trusted execution environments.

FIG. 1 is a schematic illustration of a network 111 connecting a mobile device 103 to one or more remote service provider (SP) servers 113. The SPs may provide any of a myriad of possible services. Typical examples include online banking, online commerce, online instruction, online voting, etc. As a reader hereof appreciates, in these examples, security of the transactions is extremely important.

A user 101 operates a mobile device 103 to interact with one of the SP servers 113 over the network. Such interactions are advantageously performed using special purpose application programs downloaded to the mobile device 103. Such special purpose application programs, also known as Apps, provide the user with a feature rich environment through which the user 101 interacts with server applications. The user may obtain the Apps from an app store 115. Examples of app stores 115 include the app store provided by Apple Inc., Cupertino, Calif., USA, for apps for the IOS devices such as iPhone and iPad, the Google Play app store provided by Google Inc., Mountain View, Calif., USA, and the Windows Store by Microsoft Corp., Redmond, Wash., USA.

As a reader hereof appreciates, for many online transactions security is of paramount importance. Therefore, the apps themselves must be trusted and data managed by the apps must be protected.

Figure 2:
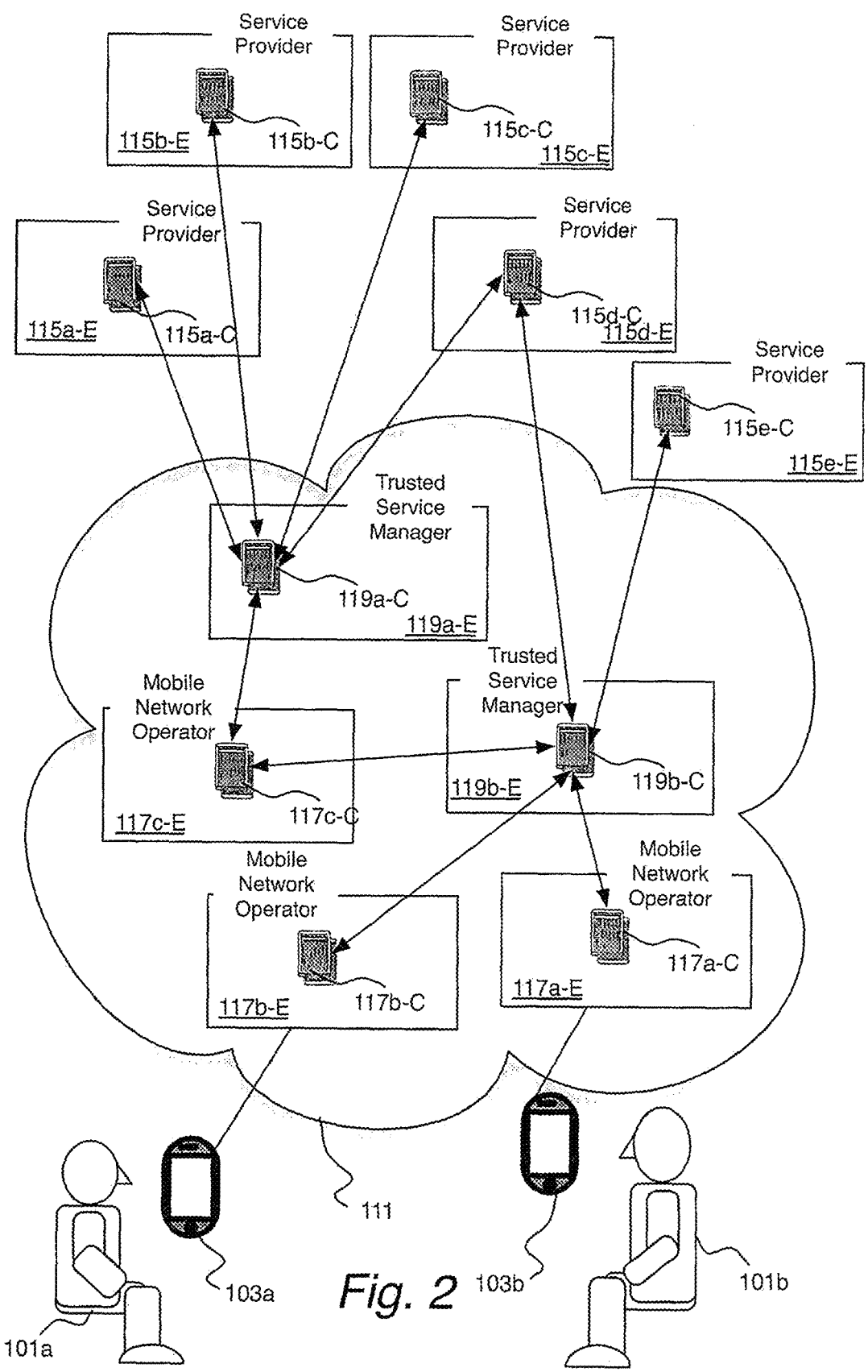
FIG. 2 is a high-level schematic illustrating more detail of the network of FIG. 1.

FIG. 2 is a high-level schematic illustrating more detail of the network 111. Each subscriber mobile device 103 communicates to the other network devices over a mobile network operator (MNO) 117 to which the user 101 of the device 103 is a subscriber, e.g., the MNO 117 may be the provider of mobile telephony services.

If individual service providers (SPs) have to interact with each individual mobile network operator for transmission of messages, management of applications, provision of services, and provision of security mechanisms, whether as part of transactions or as part of deployment, chaos would ensue. Therefore, a central actor known as Trusted Service Manager (TSM) is introduced in GlobalPlatform to manage communication between SPs and MNOs.

FIG. 2 provides an example of how the Trusted Service Manager (TSM) might play a role in conjunction with Service Providers (SP) and Mobile Network Operators (MNO). Each TSM 119[1], which is a combination of computer hardware 119-C and software (not illustrated), establishes a link between service providers (SP) 115 and mobile network operators (MNO) 117. Each TSM may connect multiple MNOs to multiple SPs. Conversely, a given SP 115 or MNO 117 may be connected to either a TSM 119 or multiple TSMs 119.

[1] In this description several related elements are referred to by n-E, n-C, and n-S, respectively. E stands for entity, C, for computer, and S, for software. Thus, n-E is the entity n-E, that operates the computer n-C, which executes according to instructions n-S. For example, Trusted Service Manager entity 119-E operates a computer 119-C which executes a trusted service manager software. For ease of description, we sometimes refer to these elements by the number n, e.g., TSM 119. Unless the context makes the contrary clear, this should typically be taken to mean as a reference to all three elements performing their respective roles, e.g., that the trusted service manager computer 119-C performs some action prescribed by the software in the trusted service manager software 119-S.

Figure 3:
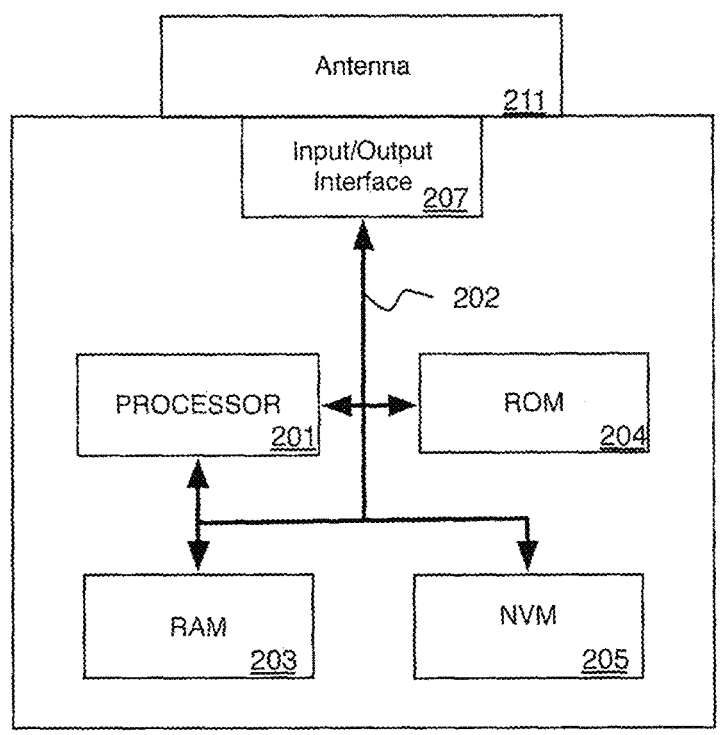
FIG. 3 is a block diagram illustrating hardware components of a mobile device of FIGS. 1 and 2.

FIG. 3 is a schematic illustration of a mobile device 103. The mobile device 103 may include a processor 201 connected via a bus 202 to a random access memory (RAM) 203, a read-only memory (ROM) 204, and a non-volatile memory (NVM) 205. The mobile device 103 further includes an input/output interface 207 for connecting the processor 201, again typically via the bus 202, to an antenna 211 by which the mobile device 103 may be connected to a host computer or other peripheral device.

Figure 4:
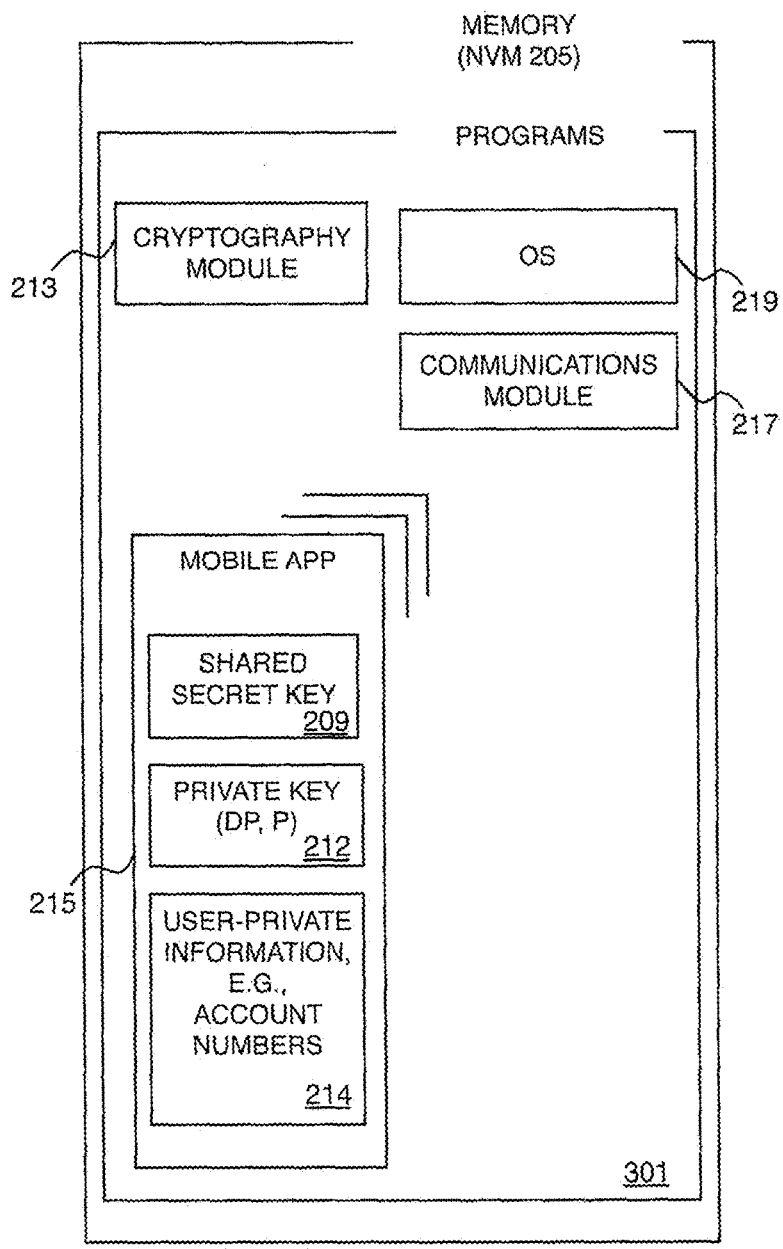
FIG. 4 is a block diagram illustrating exemplary software modules and data that may be stored in memory of the mobile device of FIGS. 1, 2, and 3 including data that should be protected from attack.

The NVM 205 may include computer programs 301 as is illustrated in FIG. 4. While it is here depicted that the computer programs 301 are all co-located in the NVM 205, in actual practice there is no such restriction as programs may be spread out over multiple memories and even temporarily installed in RAM 203. Furthermore, the mobile device 103 may include multiple ROMs or NVMs. The programs 301 include operating system programs as well as application programs loaded on to the mobile device 103. The NVM 205 of the mobile apps 215 may also contain private data, such as a private key 212 or a shared secret key 209, stored either in its basic form or in derived quantities, as well as other user-private information 214 such as account numbers. A mechanism for securing such data is described herein below.

The mobile device 103 programs 301 may include a cryptography module 213, a communications module 217, and the operating system OS 219.

As discussed herein above, mobile apps 215 may be used to operate on very sensitive data, e.g., access of online banking accounts, and providing access to secret data. To secure such a mobile app 215, a technology is provided that divides the mobile app 215 into two parts that are referred to herein as a non-trusted portion and as trusted portion. The non-trusted portion is that portion which executes in a rich execution environment (REE) 501 provided by the mobile platform, e.g., IOS or Android. The non-trusted portion may, thus, provide for a rich user experience provided by the mobile platform while the developer and service provider do not need to be concerned about security breaches of that portion. In other words, it is considered safe to unload the distribution of the non-trusted portion onto a distributor that is not trusted, e.g., an app store.

On the other hand, the trusted portions are portions of a mobile app 215 for which security measures are required. Those portions are downloaded from a trusted site over a secure channel and are further secured by cryptography.

Figure 5:
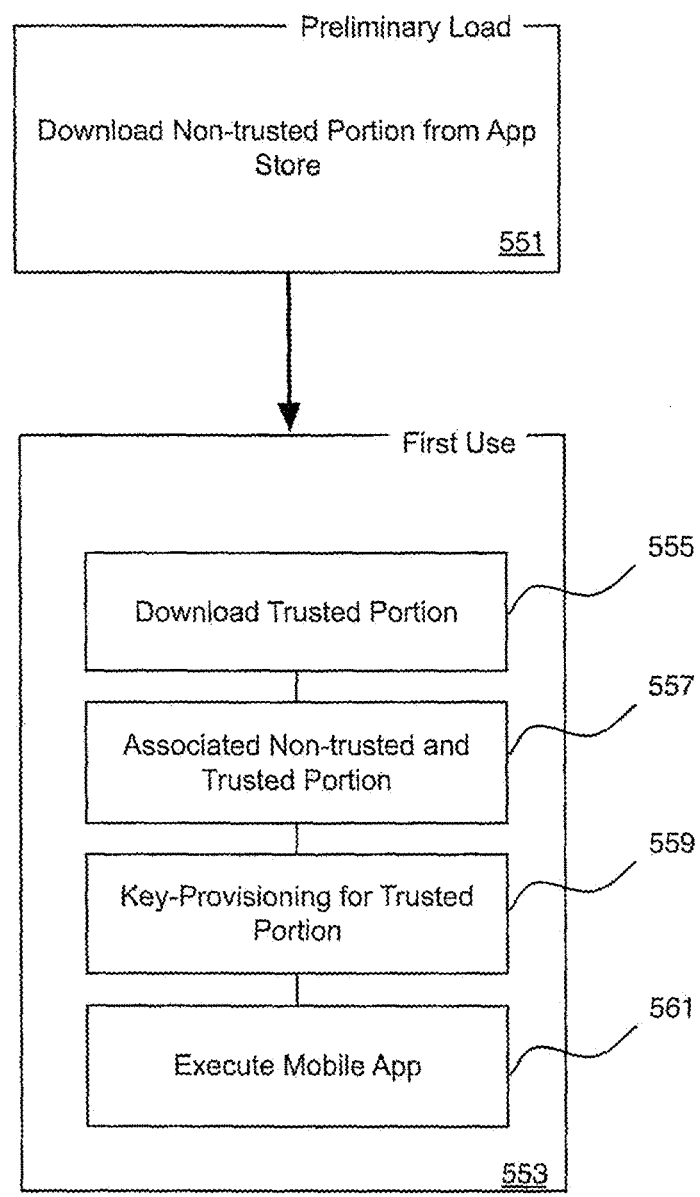
FIG. 5 is a flow-chart illustrating the steps of loading a mobile app onto a mobile device of FIGS. 1, 2, 3, and 4, and initializing security aspects of such mobile app according to one embodiment.

FIG. 5 is a flow-chart illustrating the steps of loading and initializing a secure mobile app 215 according to one embodiment. A user 101 (or another actor such as a mobile network operator 117) installs a non-trusted portion into the NVM 205 of a mobile device 103, step 551. As illustrated in FIG. 5, the initial step 551 may consist of downloading the non-trusted portion from an app store, e.g., the Apple Inc. App Store for 105 devices or the Google Play for Android devices. Details of the non-trusted portions are discussed in conjunction with FIG. 6 below.

Loading and securing the trusted portion of the mobile app 215 may occur on the first use of the mobile app 215, step 553, typically under the auspices of the bootstrap module 509. In a substep 555, the trusted portion is downloaded from a trusted server known as the provisioning server, e.g., the trusted service manager 119, the service provider or a delegate of the service provider that can be authenticated. Details of the components of the trusted portion of a mobile app 215 are discussed in conjunction with FIG. 6, note, however, that each mobile app 215 consists of one or more trusted applications 519.

The loading of the trusted and non-trusted portions of the mobile app 215 may be followed by a step 557 which associates these portions in some manner so that method invocations from the non-trusted portion arrive at the expected trusted applications 519, and the association step may include a linking step.

The mechanism for securing the trusted portions and data stored in trusted storage associated with the trusted applications 519 relies on cryptographic keys. During the initial run of the mobile application, a key-provisioning step 559 is executed to obtain the necessary keys. The key-provisioning step 559 is described in greater detail below, for example, in conjunction with FIGS. 8 and 9.

Then, once the trusted portions have been loaded and linked with the non-trusted portions, the mobile app 215 is executed, step 561.

Figure 6:
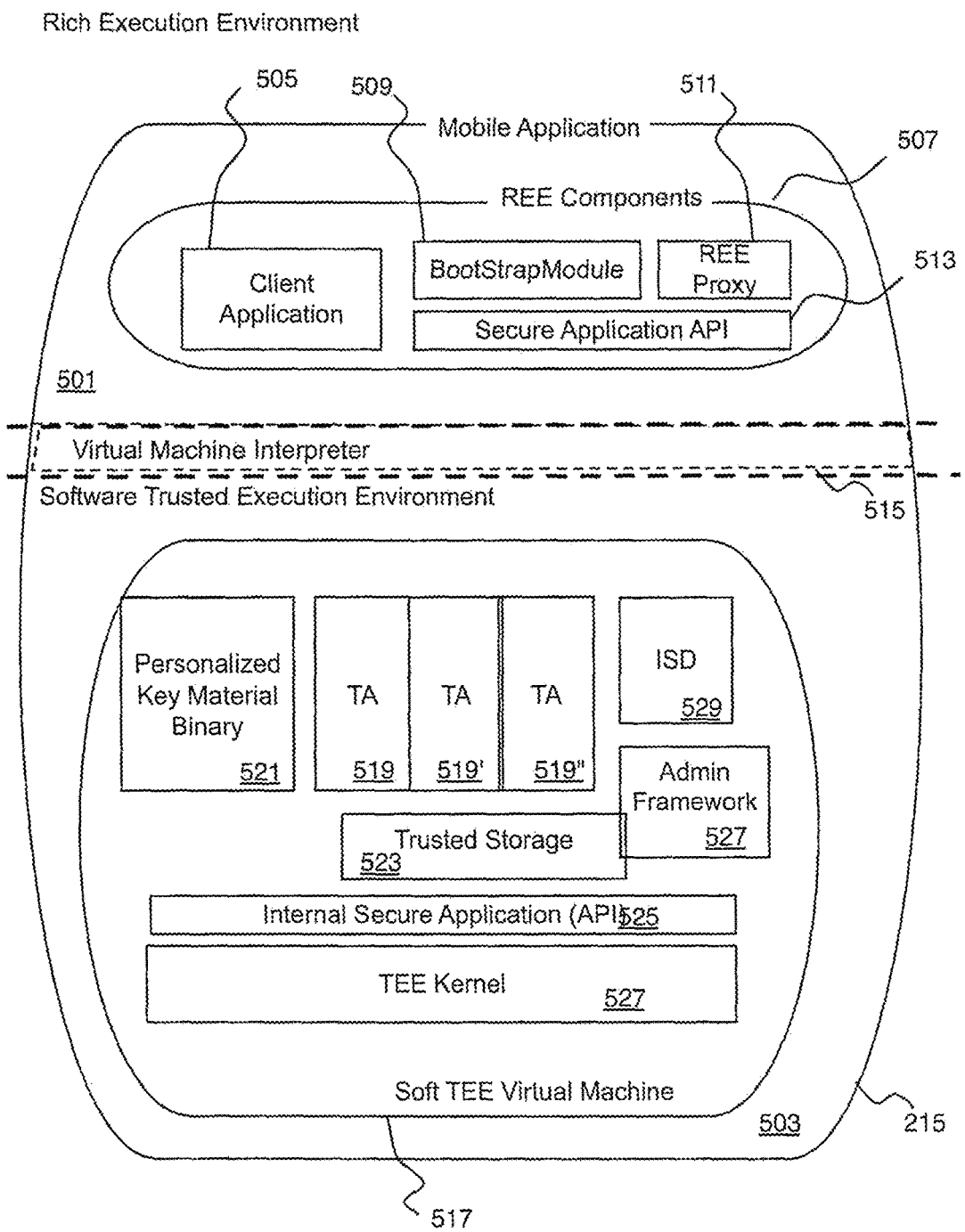
FIG. 6 is a block diagram illustrating an embodiment of a mobile device with a trusted execution environment for mobile applications according to an embodiment.

FIG. 6 illustrates one embodiment for providing a trusted execution environment for mobile applications 215. At a high-level, a mobile app 215 consists of two parts, non-trusted portion and trusted portion. The former may be downloaded from a non-trusted source and does not need to be secured. The non-trusted portion includes elements of the mobile app 215 that execute in a rich execution environment (REE) 501 provided by the mobile platform OS as well as infrastructure pieces of the trusted execution environment that do not need to be secured. The trusted portions are loaded from trusted sources, cryptographically secured, and then execute through a software trusted execution environment (soft TEE) 503 that is incorporated into the mobile app 215.

A virtual machine interpreter 515 of the mobile platform OS interpret the instructions of the non-trusted portions of the mobile app 215.

Mobile platforms, such as smartphones, provide a rich execution environment (REE) 501. The REE 501 provides an extensive and flexible repertoire of functionalities from which powerful, attractive, and useful mobile apps 215 may be built. Any user of a smartphone at the many things that the phone can be used for and the clever user interfaces that are provided by the variety of apps that a user may use on a daily basis. While the REE provides a rich and powerful execution environment, the REE leaves the device vulnerable to attacks that may compromise sensitive or valuable information of the user of the device. The technology described herein provides a mechanism by which these security risks are mitigated by introducing the Soft TEE 503 into the mobile app 215.

The non-trusted portions loaded in step 551 include the portions of the mobile app 215 that execute in the REE 501. These REE components 507 include a client application 505, a BootStrapModule 509, a REE Proxy 511, and a Secure Application API 513. The BootStrapModule 509 contains instructions to marshal key provisioning from the provisioning server, initial loading of trusted components and linking the components. The REE Proxy 511 provides a mechanism by which the mobile app 215 may interact with external servers, in particular, the trusted service manager 119. The REE Proxy 511 further interfaces with an Issuer Security Domain (ISD) 529. A memory area allocated for specific GlobalPlatform applications may be administered in secure areas referred to as Security Domains (SD). Security Domains are on-device representatives of off-device authorities. Security Domains (SD) support security services such as key handling, encryption, decryption, digital signature generation and verification for applications of the entities associated with each SD, e.g., the Issuer or Trusted Service Manager. Each SD is established on behalf of a particular actor, e.g., the card issuer (Issuer Security Domain), an application provider (Application Security Domain), or a TSM (TSM SD). SDs are established to isolate keys and other secure information from one actor to other actors and vice versa.

Thus the ISD, the issuer security domain, is a security domain on the mobile device associated with the issuer of the device and used to manage keys associated with the issuer. The ISD 529 may be downloaded to the mobile device 103 during the initial loading of the mobile app in step 551.

The Secure Application API 513 may, for example, be an implementation of the GlobalPlatform Client API as defined in TEE Client API Specification v1.0|GPD_SPE_007, GlobalPlatform, December 2011 globalplatform.org. The non-secure portion of the mobile app 215 accesses the secure portions of the mobile app 215 using the Secure Application API 513. In GlobalPlatform, a trusted execution environment (TEE) is implemented in hardware and accessed by applications using the GlobalPlatform Client API. In one embodiment, the Secure Application API 513 is implemented to emulate the GlobalPlatform Client API so that a mobile app 215 may be written once and either executed on a device that has a hardware implementation of a TEE or using a Soft TEE 503 as described herein. Thus, through implementation of the Secure Application API 513 as a GlobalPlatform Client API emulation, the mobile app 215 is easily ported to a device that implements the GlobalPlatform TEE.

The Secure Application API 513 may be downloaded to the mobile device 103 during the initial loading of the mobile app in step 551.

Thus, to overcome the security risks of the REE 501, a software trusted execution environment (Soft TEE) 503 is provided in the mobile application 215. The Soft TEE 503 infrastructure is downloaded with the REE components 507 in the initial download step 551.

A Soft TEE virtual machine (Soft TEE VM) 517 is a central component of the Soft TEE 503. The Soft TEE VM 517 may be downloaded in the initial download step 551. The Soft TEE VM 517 provides an emulation layer inside the mobile app 215. The Soft TEE VM 517 executes an instruction set that is different than the instruction set of the host environment and should therefore not be confused with the machine's native virtual machine interpreter 515. Programs that execute in the Soft TEE 503, e.g., the trusted applications, are compiled against this special instruction set and the resulting trusted application binaries 519 are interpreted by the Soft TEE VM 517.

The entire Soft TEE 503 system executes within the Soft TEE VM 517 to ensure execution isolation from the client application 505. When the client application 505 requests access to resources protected by the Soft TEE 503 it makes calls on the Secure Application API 513. The Soft TEE VM 517 retrieves these requests and dispatches these requests to a corresponding trusted application 519.

As discussed above, the trusted application 519 is compiled against an instruction set interpretable by the Soft TEE VM 517. To access the functionality of the TEE 503, the trusted application uses calls to a TEE kernel 527 via an internal secure application API 525.

Figure 7:
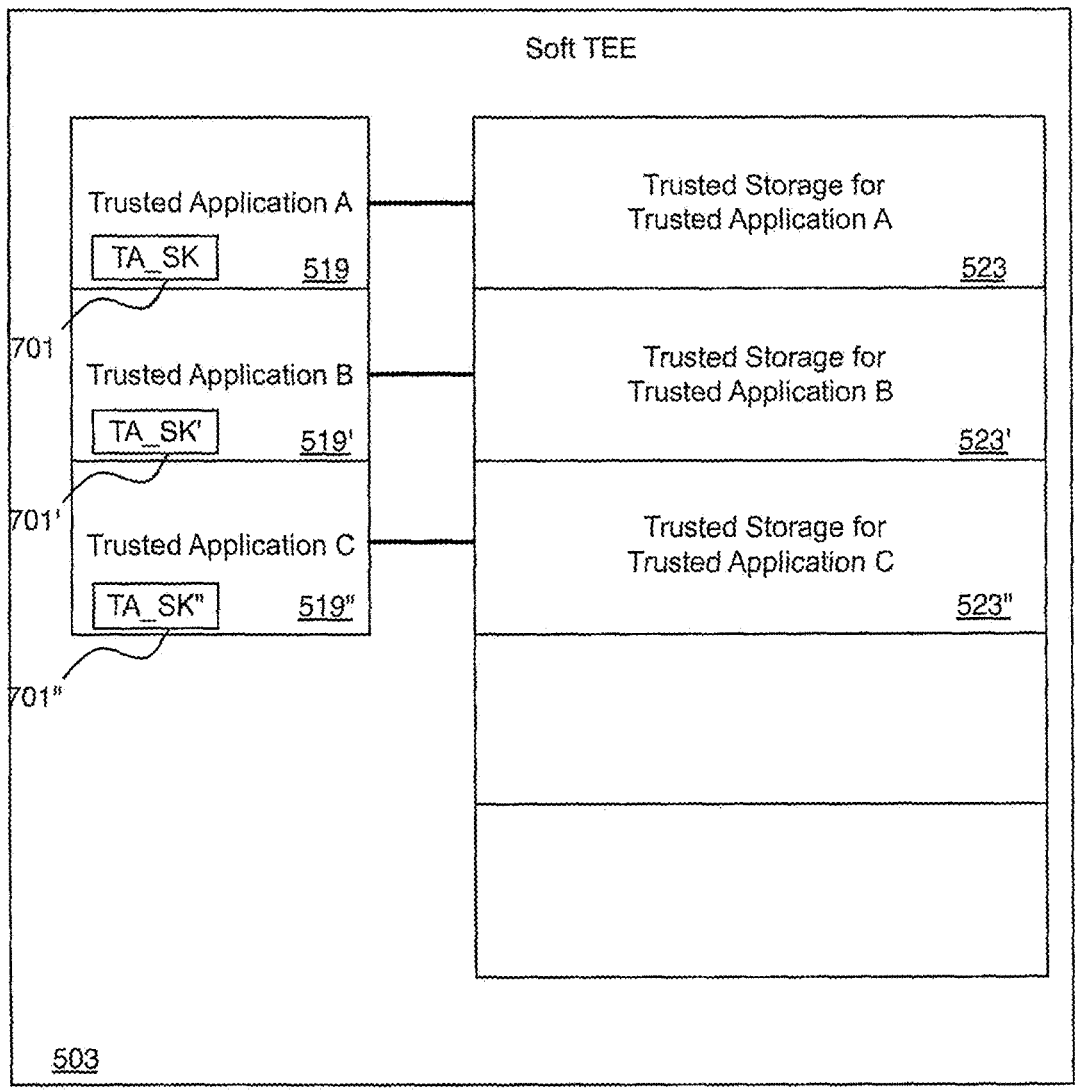
FIG. 7 is a block diagram illustrating the relationship between trusted applications and trusted storage areas.

An important function of a trusted execution environment is to isolate data items that need to be protected from untrusted components, such as the client app 505. Accordingly, the Soft TEE 503 includes trusted storage 523. A portion of the trusted storage 523 is associated with each trusted application 519. FIG. 7 is a block diagram illustrating the relationship between trusted applications 519 and trusted storage areas 523. Data stored in the trusted storage areas 523 are encrypted with data encryption keys, e.g., trusted application storage keys 701, respectively. The trusted application storage keys 701 are provided to the trusted applications 519 as a result of the key-provisioning step 559, which is described in greater detail below.

Further, the personalization of the mobile app 215 during the key-provisioning step 559 includes provisioning the Soft TEE 503 with personalized cryptographic key material 521 that is used to securely receive the trusted application 519 and to derive the trusted application storage key 701 for each trusted application 519.

Figure 8:
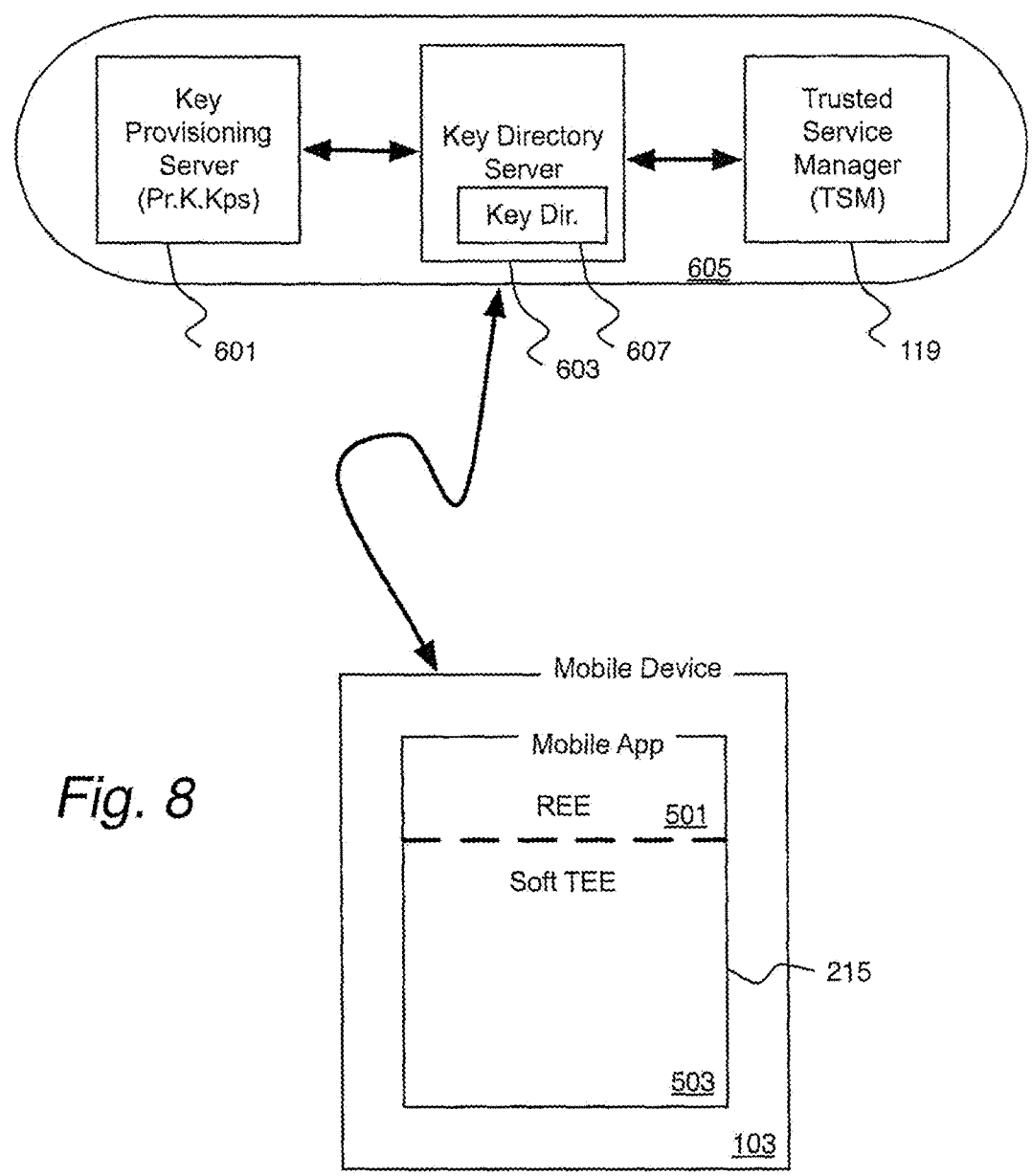
FIG. 8 is a connection diagram illustrating connections between the Mobile Device on which a mobile application is loaded and a Trusted Service Manager hub for performing key diversification used in provisioning of the trusted application of FIG. 6.

FIG. 8 is a connection diagram illustrating connections between the Mobile Device 103 on which a mobile application is loaded and a Trusted Service Manager hub 605 for performing key diversification used in provisioning of the trusted application of FIG. 6.

A mobile device 103 is connected to a trusted service manager 119 and as depicted in FIG. 2, the connection may be via a mobile network operator 117.

The trusted service manager 119 may be co-located with several related servers, e.g., a key provisioning server 601 and a key directory server 603, in what we may refer to herein as a trusted service manager hub 605. These components of the trusted service manager hub 605 cooperate with the mobile device 103 to provide a software TEE 503 to enhance the security of the mobile application 215.

The principal role of the key provisioning server 601 is to generate white-box cryptography keys and an Initial Pin Encryption Key (IPEK) that are used in the provisioning of the trusted application 519 that corresponds to the REE components 507 of the mobile application 215. White-box cryptography is described in S. Chow, P. Eisen, H. Johnson, P. C. van Oorschot, White-Box Cryptography and an AES Implementation. In 9th Annual Workshop on Selected Areas in Cryptography (SAC 2002), Aug. 15-16, 2002, and in Julien Bringer, Herve Chabanne, and Emmanuelle Dottax, White Box Cryptography: A New Attempt, Cryptology ePrint Archive, Report 2006/468, 2006, both herein incorporated by reference.

A private key, Pr.K.Kps, is associated with the key provisioning server to allow it to sign keys that it produces.

The principal role of the key directory server 603 is to maintain a database of IPEK keys associated with unique identifiers for the software TEE 503 for a particular instantiation of the mobile app 215 executing on a particular device 103. That directory, which may be a database table, is referred to herein as the key directory 607. The unique identifier for the software TEE is referred to herein as the TEE ID and is described in greater detail below. Given a particular TEE ID the key directory server can provide an inquiring client, e.g., the trusted service manager 119, with the corresponding IPEK.

The principal role of the trusted service manager 119 in the context of providing a trusted application 519 to a mobile device 103 is to receive from the mobile device 103 a request for the trusted application 519. The request includes a mechanism by which the mobile device 103, specifically the mobile application 215, can identify itself and prove its authenticity, namely, by providing the TEE ID and the IPEK. In one embodiment, as is described herein below, the IPEK is provided by the mobile device 103 in the form of a hash.

Figure 9:
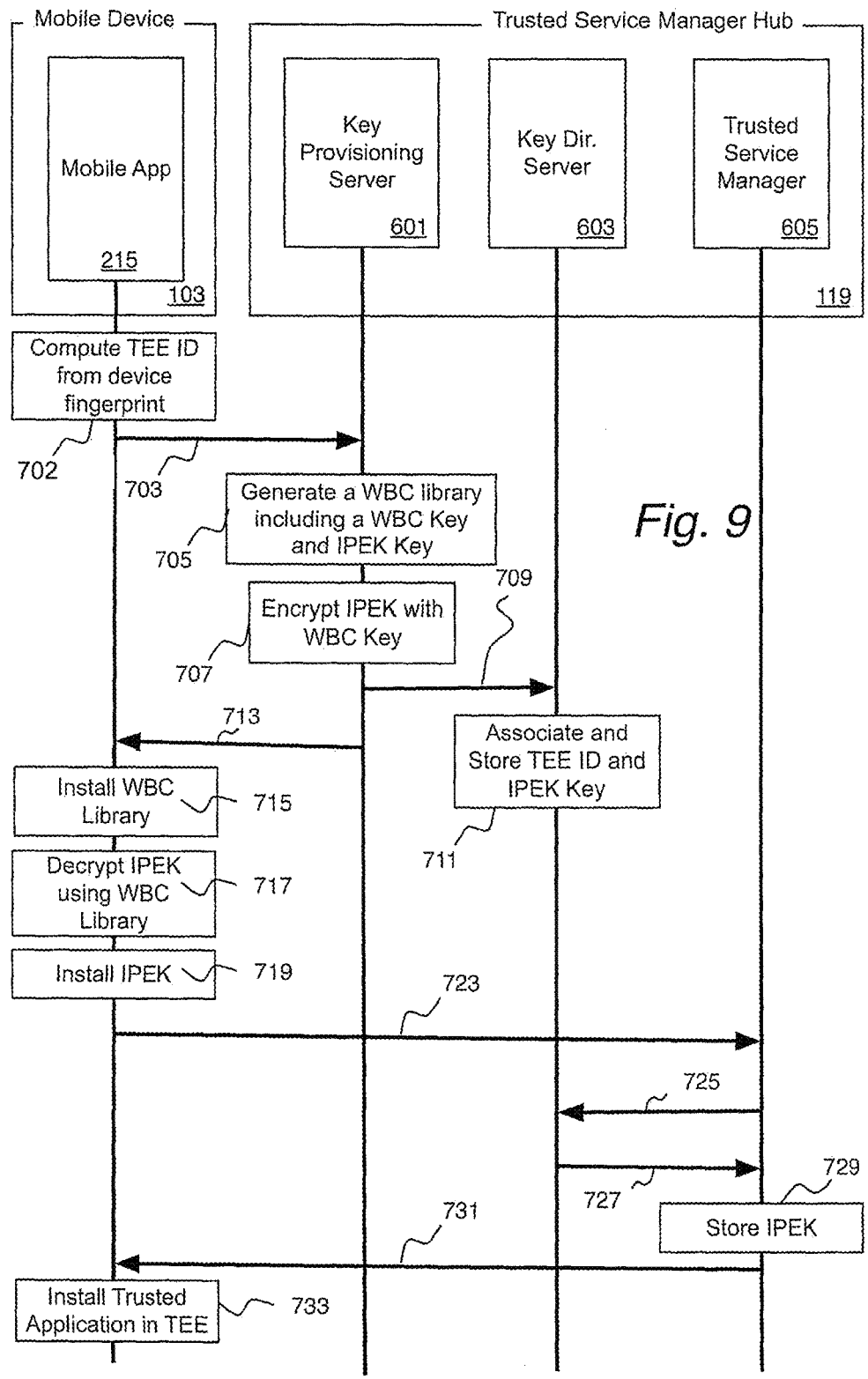
FIG. 9 is a timing sequence diagram illustrating the key diversification that allows for secure provisioning of a trusted application.

FIG. 9 is a timing sequence diagram illustrating the key diversification that allows for secure provisioning of a trusted application. As a preliminary step (not shown) the REE components of the mobile app 215 are downloaded to the mobile device 103, for example, from an app store.

Step 702. The mobile application 215, specifically the REE components of the mobile application 215, determines a unique identifier (TEE ID) for the mobile application 215 as it executes on the mobile device 103. In other words, the TEE ID depends on both the application and the device. In one embodiment, the TEE ID is calculated to depend on a Universally Unique Identifier (UUID) assigned to the application and a device fingerprint of the mobile device 103. These can for example be used to produce a hash or can be concatenated to create the TEE ID.

The device fingerprint may be calculated as a hash, e.g., SHA1, of a concatenation of the application identifier, a unique OS identifier, the radio serial of the mobile device 103 and the IMEI of the mobile device 103. The application identifier is the package name of the application (com.companyname.appname as an example). The unique OS identifier is the parameter provided by underlying OS, such as AndroidID for in Android OS and Volume UUID in iOS. The radio serial is the serial number of the radio unit on the mobile device. The IMEI, the International Mobile Station Equipment Identity, is a unique number assigned to a mobile device and is specified in the 3GPP TS 23.003 specification of the 3.sup.rd Generation Partnership Project.

Step 703. The TEE ID is transmitted from the mobile app 215 to the key provisioning server 601.

Step 705. The key provisioning server 601 receives the TEE ID from the mobile app 215 and generates an initial PIN encryption key (IPEK) to be associated with the TEE ID and a dynamic white-box cryptography key (WBC key, $K_m$).

In a preferred embodiment, the IPEK is a unique random AES-256 key generated by the key provisioning server 601. AES-256 is a version of the Advanced Encryption Standard using 256-bit keys.

White-box cryptography is outside of the scope of this document. However, the following salient points are useful to the understanding of the technology presented herein. White-box cryptography is used to protect distributed materials that are distributed beyond to access control enforcement of the distributor. For example, in the present context, a mobile device is beyond the control of the issuer of the device as well as beyond the control of the service providers who may distribute apps for use on the mobile device. White-box cryptography uses obfuscation techniques to protect distributed materials. In Step 3 (705) a white-box cryptography library (WBC) binary is created to contain a unique random AES-128 key that includes a hash of the TEE ID, the WBC key that is hidden in an AES-encrypted message using white-box cryptography techniques.

Step 707. The IPEK key is encrypted by the key provisioning server 601 using the WBC key.

Step 709. The TEE ID and the IPEK key are transmitted to the key directory server 603.

Step 711. The key directory server 603 associates the TEE ID and IPEK key and stores them in the key directory 607.

Step 713. In parallel with sending the TEE ID and IPEK key to the key directory server 603, the key provisioning server 601 transmits the WBC key library and encrypted IPEK key to the mobile application 215.

Step 715. The mobile application 215 installs the WBC library. By installing the WBC library, the mobile application 215 may use the library to decrypt information encrypted using the library, in this case the IPEK key.

Step 717. The mobile application 215 uses the WBC library to decrypt the IPEK key.

Step 719. The IPEK key is stored into the issuer security domain (ISD) 529, which was downloaded with the non-trusted components of the mobile app 215 in step 551 of FIG. 5.

Step 723. Mobile application 215 transmits the TEE ID and a hash of the TEEID using the IPEK (HMAC(TEEID, IPEK)) to the trusted service manager 605.

Step 725. The trusted service manager 605 forwards the TEE ID and the hash (HMAC (TEEID, IPEK)) to the key directory server 603 for verification that there is a match. As the key directory server 603 maintains a table (step 711, above) of TEE ID and corresponding IPEK, the key directory server 603 can verify that the hash transmitted from the mobile app 215 to the trusted service manager 605 in step 723 matches the hash one would expect from the correct IPEK.

Step 727. If the key directory server 603 has confirmed the IPEK and TEE ID correspondence, the key directory server 603 transmits the IPEK back to the trusted service manager.

Step 729. The trusted service manager 605 stores the IPEK. The trusted service manager 605 also encrypts the TA 519 using a session key generated using the IPEK.

Step 731. The trusted service manger 605 transmits the encrypted TA 519 to the mobile app 215.

Step 733. The mobile app 215 decrypts the TA 519 using the session key generated from the IPEK and installs the TA 519 into the Soft TEE 503.

Thereby, the mobile app 215 has been completed to include the trusted components, the key material 521 and the TA 519, as well as the non-trusted components downloaded initially.

Figure 10:
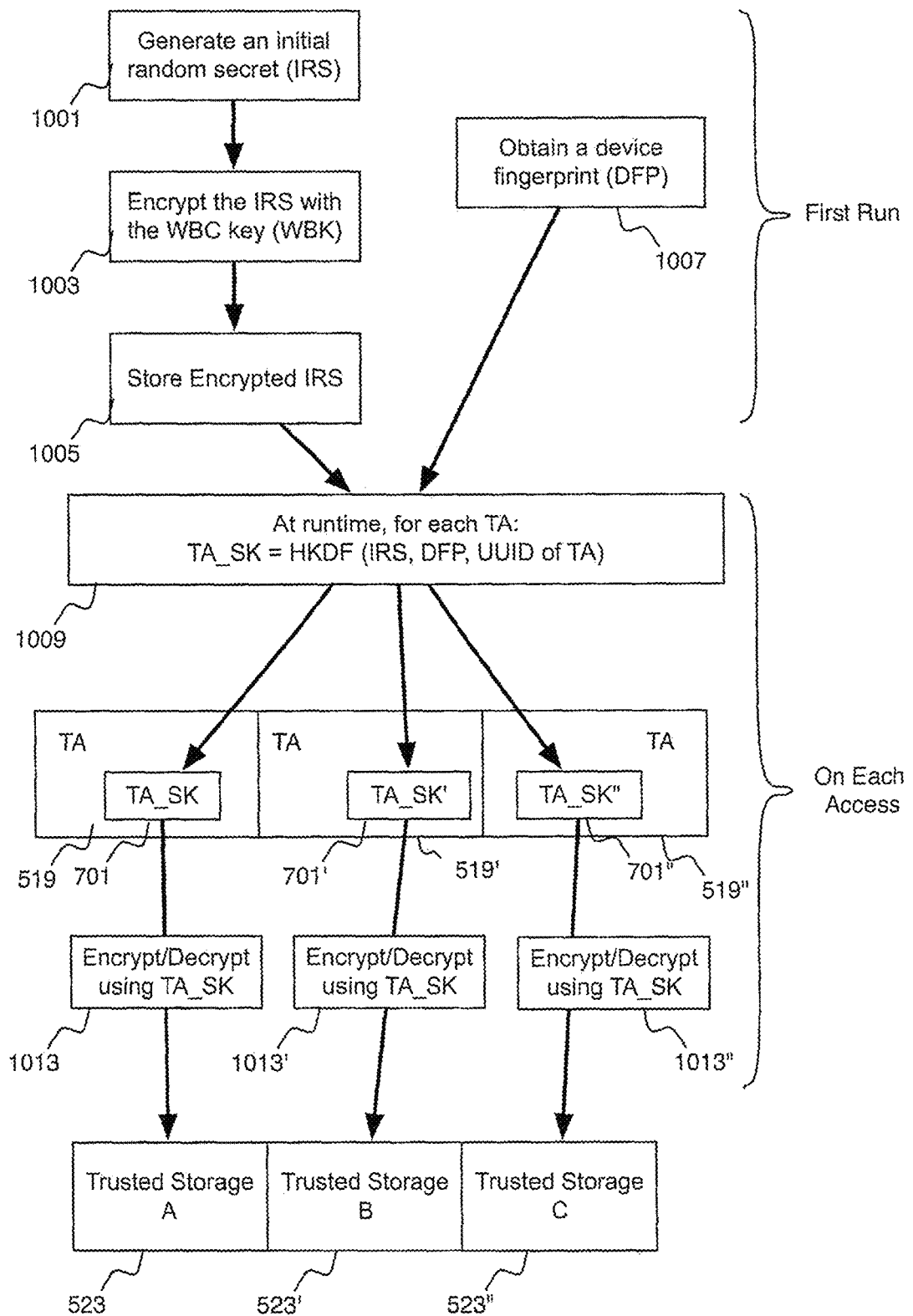
FIG. 10 is a data-flow diagram illustrating the use of a white-box cryptography key from the process illustrated in FIG. 9 as a root-of-trust for securing storage for the trusted application of FIG. 6.

As noted above, the trusted storage 523 corresponding to each trusted application 519 is protected by a trusted application storage key (TA_SK) 701. FIG. 10 is a flow-chart illustrating the generation of these storage keys.

Step 1001. An initial random secret (IRS) is generated by the mobile app 215.

Step 1003. The IRS is encrypted by the mobile app 215 using the dynamic white box cryptography key (WBK) from FIG. 9, step 705, and provided to the mobile app in Step 713.

Step 1005. The encrypted IRS is stored by the mobile app 215 in file-storage managed by the mobile app 215 in the NVM 205.

In an alternative embodiment, steps 1001 through 1005 are replaced by entry of a PIN by the user. The PIN is not stored. Rather, as discussed in Step 1009 below, it must be re-entered correctly on each execution or the calculated storage key would not match the storage key used on the first execution.

Step 1007. In parallel to Steps 1001-1005, a device fingerprint (DFP) is calculated by the mobile app 215. The DFP may be calculated by the SHA1 of the concatenation of the application identifier, unique OS identifier, radio serial number and IMEI number of the device.

The preceding steps of FIG. 10 are advantageously performed once with results, i.e., encrypted IRS and DFP, stored in NVM 205. The following steps are run-time steps that are used when accessing trusted storage.

Step 1009. At runtime, for each TA 519 the TA storage key (TA_SK) 701 is computed using, for example, a HMAC based key derivation function, specified in RFC 5869 (IETF, HMAC-based Extract-and-Expand Key Derivation Function (tools.ietf.org). The inputs to the HASH function include the IRS, DFP, and UUID of the TA 519. In the alternative embodiment using a user PIN, the user is prompted for the PIN. The PIN originally entered is not stored. However, as for each execution the PIN is used to compute the TA storage key, the correct PIN must be entered for the correct TA_SK to be calculated in Step 1009 on subsequent executions.

Steps 1013. When a trusted application 519 seeks access to its corresponding storage 523, the trusted application 701 uses its storage key TA_SK 701 to encrypt or decrypt contents stored or retrieved from the trusted storage 523.

One vulnerability to attack against a mobile app 215 is to attack memory areas in RAM used by the mobile app 215 during execution thereof. An attacker may perform a memory dump of data stored in the RAM 203 during the execution of the mobile app 215 and attempt to retrieve sensitive information such as account numbers, cryptographic keys, personal identifiers, etc. from what is stored in RAM 203.

Figure 11:
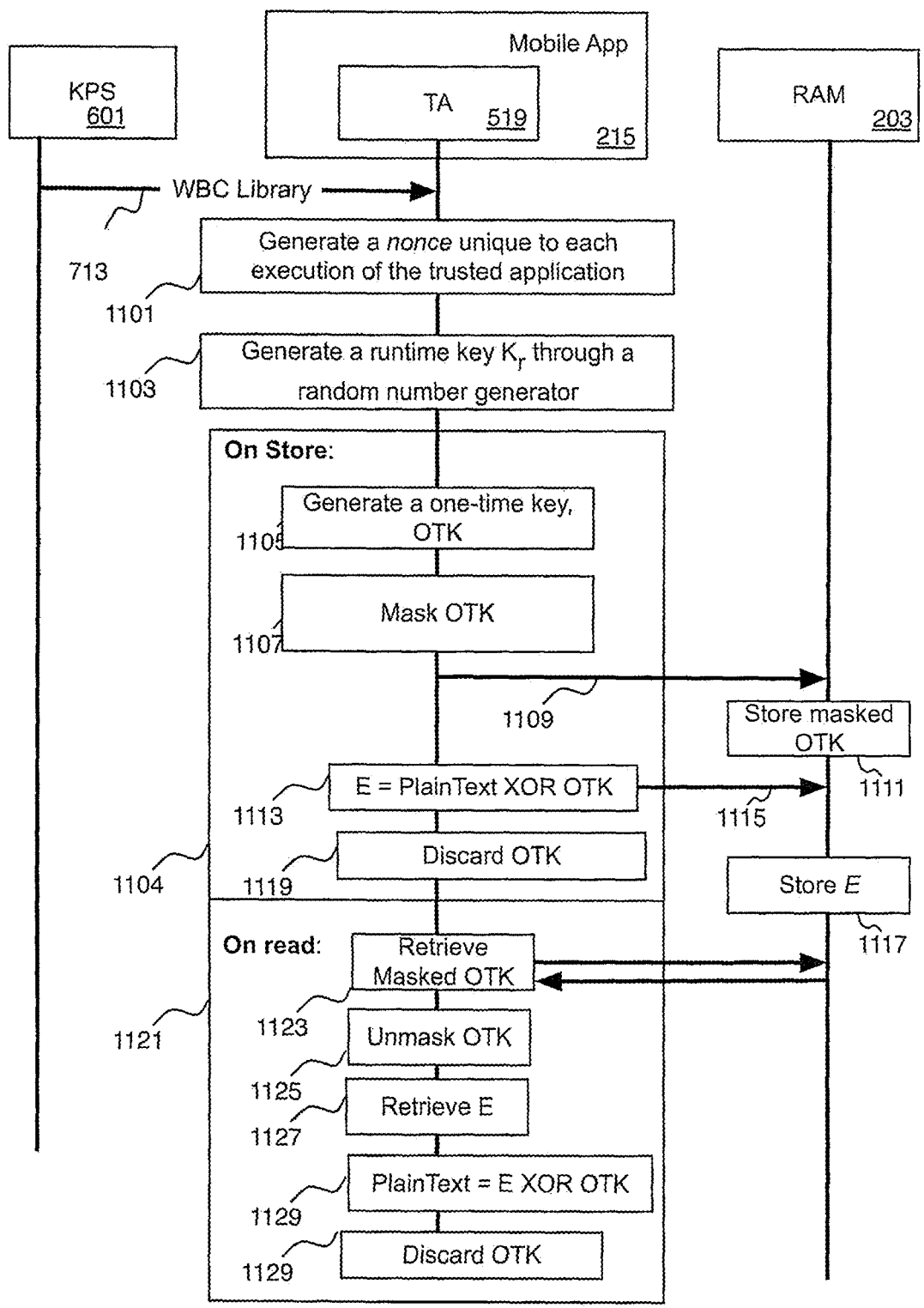
FIG. 11 is a timing sequence diagram illustrating encryption of portions of runtime memory to prevent malicious extraction of data from a runtime memory dump.

To thwart such an attack, an embodiment hereof encrypts portions of runtime memory used by the mobile app 215 in order to prevent recovery of meaningful data from a runtime memory dump. FIG. 11 is a timing sequence diagram illustrating this embodiment. Each trusted application 519 executed inside the Soft TEE 515 can access RAM 203 from a heap or stack. The heap or stack for each TA 519 is separate and isolated from the heap or stack of any other trusted application 519.

As discussed herein above, in conjunction with FIG. 9, for example, the key provisioning server 601 generates a white-box cryptography library including a WBC Key, $K_m$, and transmits this library to the mobile app 215, step 705 and 713. The Mobile App 215 installs the WBC library in step 715.

According to the present embodiment, the trusted application encrypts data stored in RAM 203 by encrypting the data using a one-time key (OTK):

E=PlainText XOR OTK

The OTK is derived as follows:

Step 1101: The TA 519 generates a nonce such that it is unique for each execution of the trusted application 519. In a preferred embodiment, the OTK is generated using a nonce. However, alternative mechanisms may be used to generate the OTK, in which case a nonce may not be necessary.

Step 1103: The TA 519 generates runtime key K using a random number generator. In a preferred embodiment, the OTK is generated using a random key. However, alternative mechanisms may be used to generate the OTK, in which case a random key $K_r$ may not be necessary.

On each store operation 1104, the OTK associated with the memory location and the particular execution of the trusted application 519 is generated, it is masked for storage, the plaintext to be stored in RAM is encrypted using the OTK, and the OTK is discarded.

Step 1105: The OTK is generated. In a preferred embodiment, the OTK is generated using the formula:

$$OTK=ENC(mem\_addr\|counter\|nonce, K_r)$$

Where, mem_addr is start address of the memory page(s) to be encrypted, counter is a counter that (1) resets on each execution of the TA 519 and is incremented on each memory access, and ENC is an encryption function in which the concatenation mem_addr∥counter∥nonce is encrypted using the key $K_r$.

Step 1107: The OTK is masked. In the preferred embodiment the TA 519 masks the OTK using the WBC key, $K_m$:

OTKm=OTK XOR $K_m$

Step 1109 and 1111: The masked OTK, $OTK_m$, is stored in RAM 203.

Step 1113: The plaintext of the quantity to be stored is masked using the OTK:

E=Plain Text XOR OTK;

Steps 1115 and 1117: the masked quantity E is transferred to and stored in RAM 203.

Step 1119: the OTK is discarded. Thus, the actual key (OTK) used to mask the plaintext before storing in RAM is never retained; rather, only the masked version $OTK_m$ of the OTK is retained and it can only be used if it is first successfully unmasked.

Conversely, on each operation to read a value stored in the RAM 203 the masked OTK is retrieved and unmasked, the encrypted quantity decrypted into plaintext, and the OTK is discarded, step 1121.

Step 1123: the TA 519 retrieves the masked OTK, i.e., OTKm, previously stored during the write operation.

Step 1125: the OTK is unmasked from OTKm using the white box key Km.

Step 1127: the encrypted quantity E is retrieved.

Step 1129: the encrypted quantity E is decrypted into plaintext:

Plaintext=E XOR OTK

Step 1131: the OTK is again discarded.

Thus, a technique is presented that protects run-time RAM against attacks that utilize memory dumps to maliciously discern confidential information of the mobile app.

A software application executing by a virtual machine is vulnerable to attacks that are based on alteration of either the static or runtime instantiation of the application. For example, an attacker may inspect the application and alter the application in an attempt to extract protected contents manipulated by the application and to manipulate the behavior of the application to cause it to reveal protected contents either directly or in a form that is possible for the attacker to somehow discern protected contents.

To thwart such attacks, embodiments of the present technology adopt one or more of several techniques.

Figure 12:
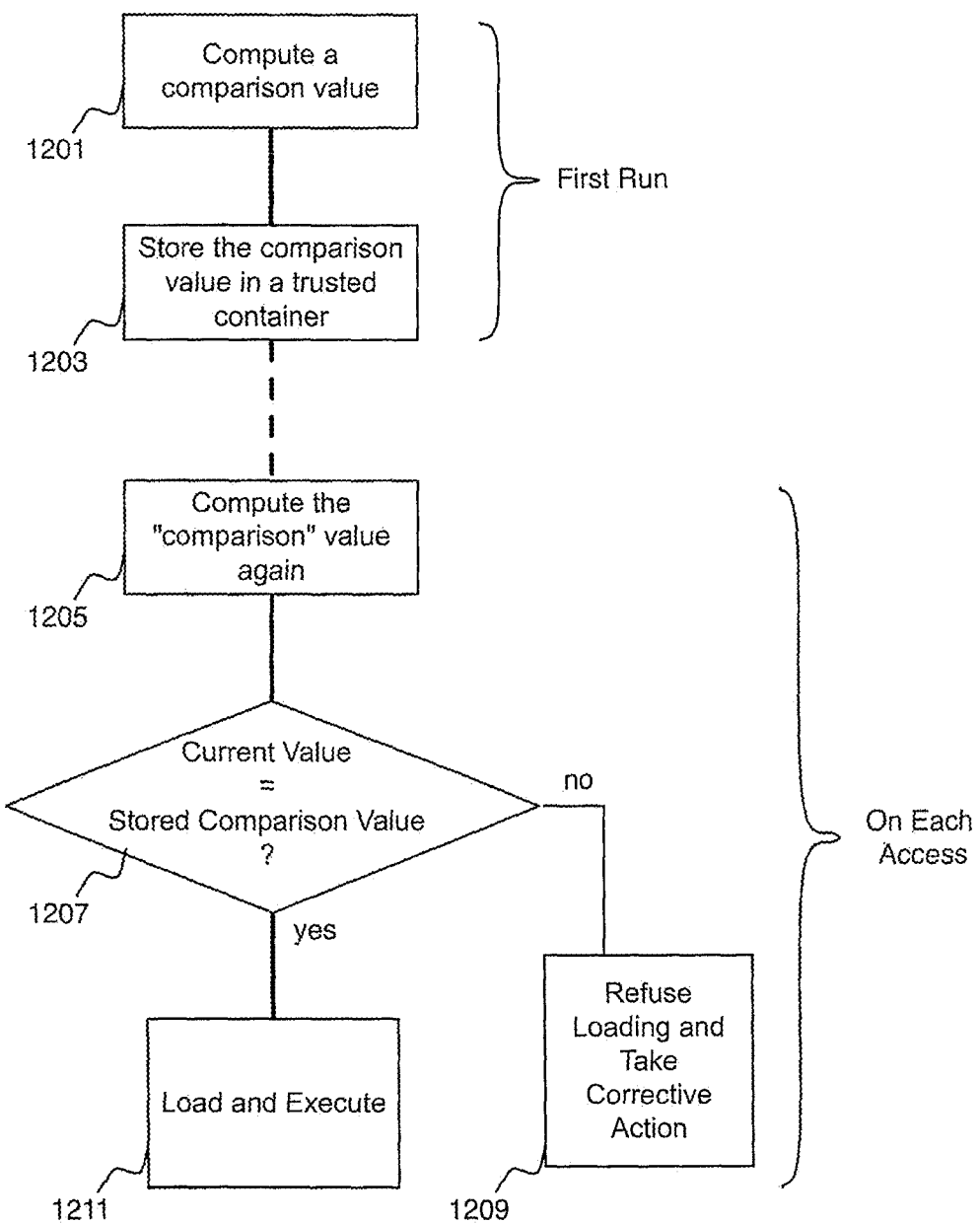
FIG. 12 is a flow-chart illustrating a mechanism of one embodiment for detecting manipulation of a trusted application.

A first of such techniques, which is illustrated in FIG. 12, is to provide for an Application Integrity Check. When a trusted application 519 of the mobile app 215 is first installed into the Soft Tee 503, the Soft TEE virtual machine 517 calculates a comparison value, e.g., a hash value corresponding to the trusted application 519, step 1201. The comparison value may be an HMAC-SHA256 MAC hash code computed over the trusted application 519 binary. The comparison value is then stored in a trusted container, for example, prepended to the TA 519 binary, step 1203.

On every execution, when the TA 519 is again loaded by the Soft TEE virtual machine 517, the same comparison value calculation is performed over the binary and compared to the stored comparison-value computed of the first load (referred to as the "current value"), step 1205. In step 1207, the decision is made whether the stored and current comparison values differ. If they are the same, the Soft TEE virtual machine 517 will load and execute the TA 519. If they do differ, the Soft TEE virtual machine 517 refuses to load the TA 519 and issues a corrective action, such as notifying a user, issuer, or service provider of the potential attack, step 1209.

Figure 13:
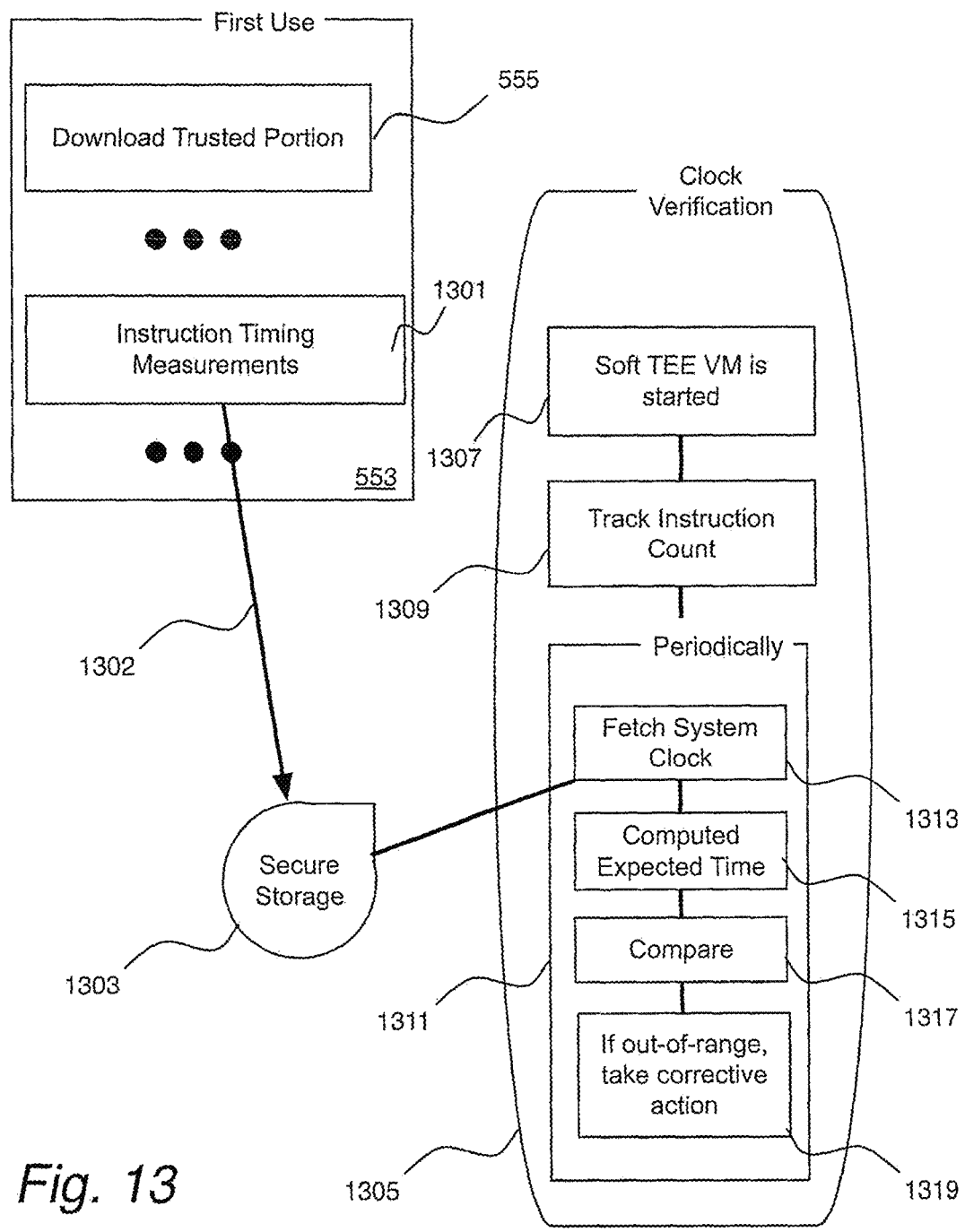
FIG. 13 is a flow-chart illustrating a mechanism for an embodiment in which a clock integrity check is used to safeguard against clock alteration attacks.

In another possible attack against a mobile app 215, an attacker alters the clock rate or performs a time-shift; the latter being of particular concern to digital rights management DRM applications. Thus, to thwart such attacks, in another embodiment, the TA 519 may be additionally or alternatively verified using a clock integrity verification technique. FIG. 13 is a flow diagram illustrating the clock integrity verification technique.

To prevent the clock alteration attacks, upon installation of the trusted portion of the mobile app 215, e.g., in step 555 or ancillary to step 555, the execution time of certain instructions of the trusted portion, e.g., calls by the virtual machine 517 of the Soft TEE 503 to specific functions in the Internal Secure API 525, are measured, step 1301, and recorded in a secure storage 1303, step 1302. Clock verification 1305 is performed when the mobile app 215 is executed. The Soft TEE virtual machine 517 is started, step 1307, when the mobile app 215 is executed and the Soft TEE virtual machine 517 keeps track of the instruction count, step 1309. Periodically the Soft TEE virtual machine 517 performs a clock verification check 1311, by fetching the system clock, step 1313, computing the expected time from the instruction count, step 1315, and comparing the system clock against the expected time, step 1317. If the difference between the expected time and the system time is out-of-range with respect to some predetermined threshold, some corrective action may be taken, step 1319, for example, halting the mobile app 215 or placing restrictions on which hardware resources may be accessed by the mobile app 215. In one embodiment, if n number of instructions would take a certain amount of time t and that therefore after having tracked to a particular instruction count, e.g., m*n, it would be expected that the execution time would to be m*t. A deviation from that beyond a particular threshold would trigger the corrective action.

Figure 14:
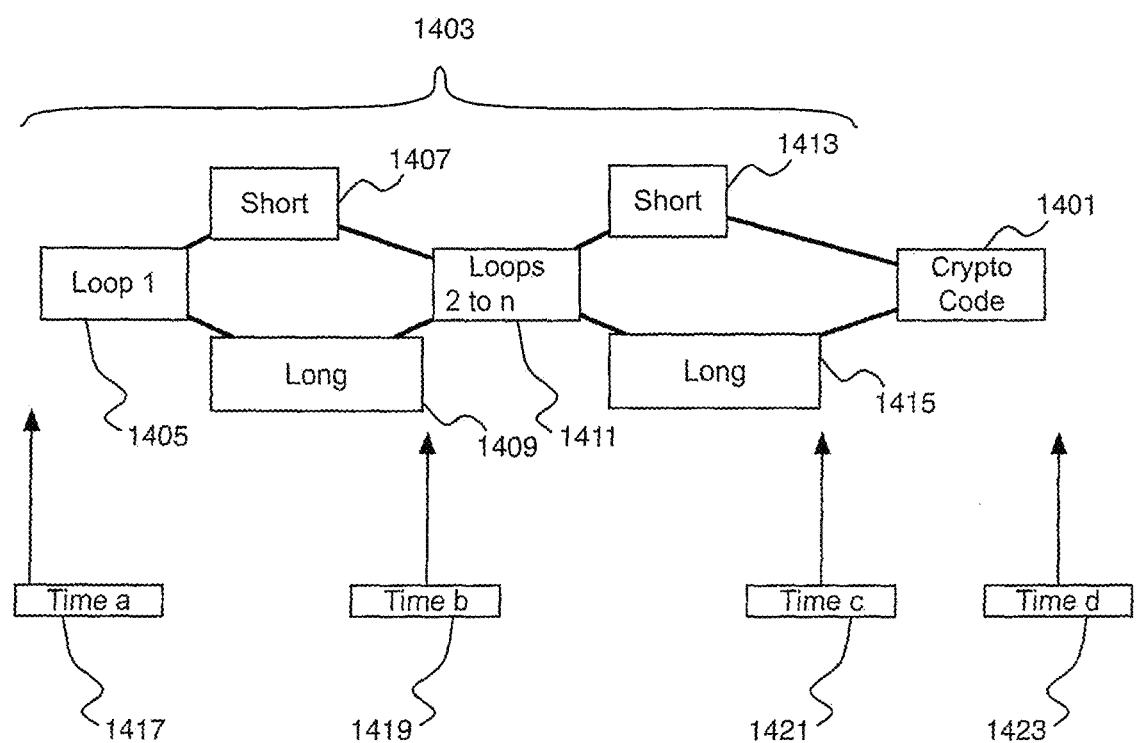
FIG. 14 is an execution path graph illustrating an example execution of a mobile app in which execution times of selected loops of known duration are inspected to determine possible manipulation, for example, by use of a debugger.

Attacks against a mobile app 215 may include using debugging techniques to inspect critical functions of a mobile app 215 while being executed by a virtual machine 515. Embodiments of the technology described herein may also include a technique for thwarting such inspection attacks that bypass anti-debugging techniques by benchmarking short and long loops added to a trusted application 519 during the installation of the trusted application 519. FIG. 14 is a timing sequence illustrating the concept.

FIG. 14 illustrates a critical portion 1401, for example, cryptography code, of a trusted application 519 that is to be protected from attack. A code segment 1403 is added to the critical portion 1401. The critical portion contains multiple possible paths and several loops. For example, a first loop 1405 contains a short block 1407 and a long block 1409. If the execution path for the first loop is through the short block of 1407 the execution of a given number of iterations of the first loop 1405 will be much shorter than if the execution goes through the long block 1409. Similarly, the loops 2 to n 1411 may be made to execute either through the short block 1413 or the long block 1415, again impacting the overall execution time.

Whichever execution path is used for the code segment 1403 is determined by a random number which would indicate which blocks are to be executed and for how many iterations.

By knowing the block execution times for short and long blocks and the number of iterations for each loop, it is possible to predict the expected elapsed time between various locations, inspection points, in the code. For example, if a long block 1409 is expected to take t cycles and a short block, 0.5*t cycles, and it is known that Loop 1 1405 is expected to execute the short block n times, it can be predicted that the time difference between Time b at inspection point 1417 and Time a at the starting point 1419 should be n*t. A deviation from that might be indicative that the code has been paused by a debugger some time during the execution of Loop 1. Similarly, with Times c and d at inspection points 1421 and 1423, respectively.

Figure 15:
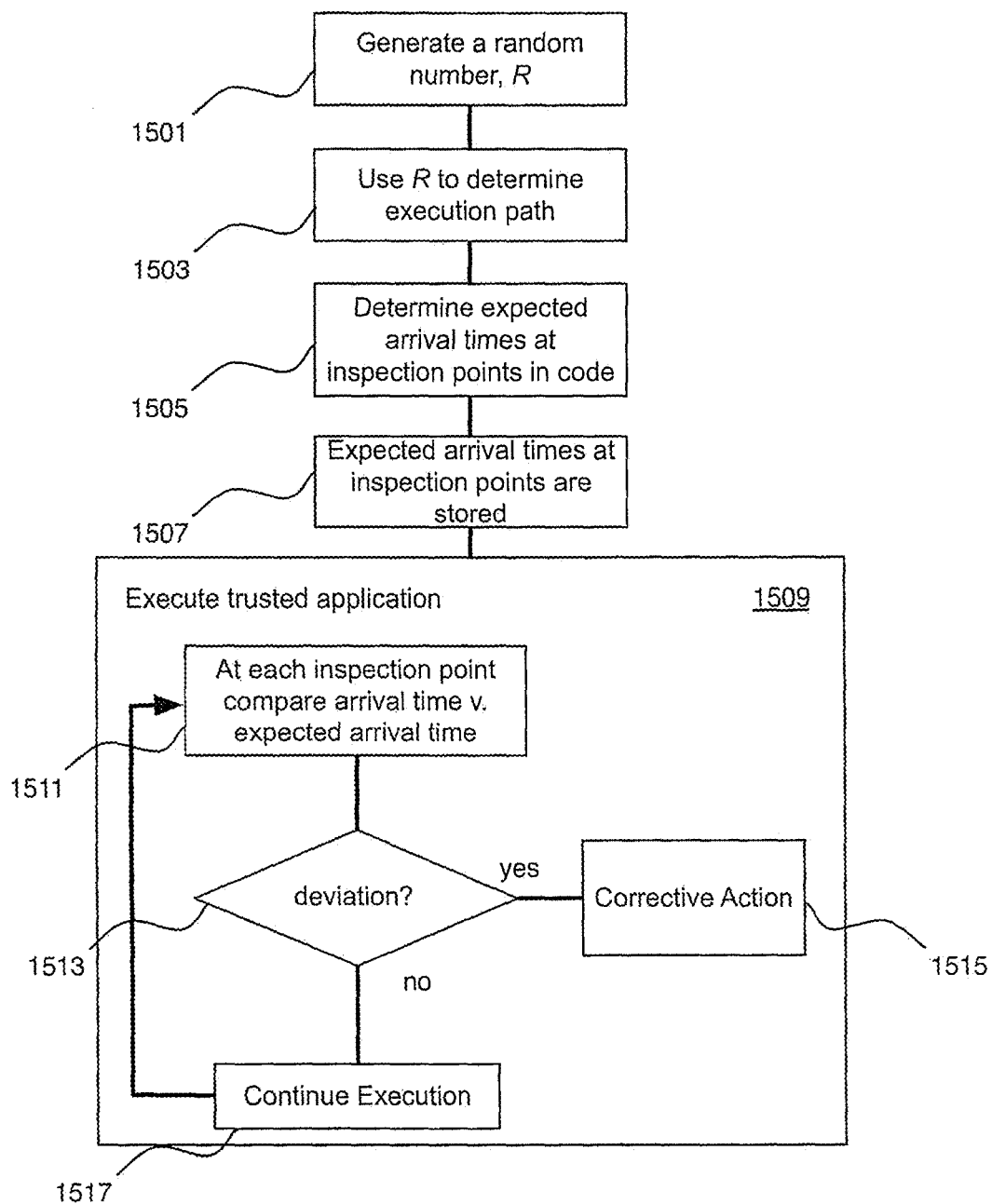
FIG. 15 is a flow-chart illustrating the randomization of the execution path during runtime in which the randomized execution duration is inspected to determine possible manipulation.

FIG. 15 is a flow chart illustrating the use of the mechanism of FIG. 14 to randomize the execution path during runtime in which the randomized execution duration is inspected to determine possible manipulation.

Step 1501: A random number, R, is generated that is used to determine the execution paths through the added dummy code segment 1403.

Step 1503: The random number R is used to determine the execution paths. For example, different bits of R may indicate whether long blocks or short blocks are executed for various loops. Other bits may indicate the number of iterations.

Step 1505: The execution paths, including whether short or long blocks are executed and the number of iterations, are used to determine expected arrival times at various identified inspection points.

Step 1507: The expected arrival times, indexed by inspection point, as well as the expected total execution times, i.e., after the execution of the critical code 1401 to be protected at inspection point 1423, are recorded ideally in some protected form such as in trusted storage 523.

Step 1509: During the execution of the trusted application: Step 1511: At each inspection point, the arrival time at the inspection point is compared against the expected arrival time. If there is a deviation beyond a pre-determined threshold (Step 1513), a corrective action (Step 1515) is taken.

Otherwise, i.e., if the deviation is acceptably small, the execution continues 1517, until the next inspection point is encountered at Step 1511.

Thus, if at some point during the execution of the trusted application, the execution is paused, e.g., using a debugger, the execution times would be perturbed and the arrival times would not match the expected arrival times. That would trigger a condition for which a corrective action would be taken.

For illustrative purposes, we describe the technology presented herein as it may be used in a mobile device 103. However, the technology presented is applicable to any programmable electronic device with a need for a secure trusted execution environment.

From the foregoing it will be apparent that a technology has been presented that improves the security of applications executing on a mobile device by providing mechanisms that introduce a trusted execution environment into mobile apps such that an increased level of trust can be expected when a mobile device is used to execute such mobile apps to manipulate sensitive data that are either stored on the mobile device or that is accessed on remote servers using the mobile device. These enhancements are achieved in a robust, flexible and economical fashion that requires no modification to the mobile device hardware yet enhances the security associated with the operation of the mobile device hardware.

Although specific embodiments of the invention have been described and illustrated, the invention is not to be limited to the specific forms or arrangements of parts so described and illustrated. The invention is limited only by the claims.

The invention claimed is:

1. A method for securing a mobile application for execution on a mobile device, comprising:
   the mobile device being configured to:
     load a non-trusted portion of the mobile application from a non-trusted application provider onto the mobile device;
     load a trusted portion of the mobile application from a trusted application provider into the mobile device by:
       the mobile application generates a trusted execution environment id "TEE ID" from an identifier of the mobile application and a device fingerprint of the mobile device; said generated a trusted execution environment id "TEE ID" being transmitted by the mobile application to a key provisioning server;
       operating the key provisioning server to generate keys to be associated with the trusted execution environment id "TEE ID" and transmitting to a key director server the trusted execution environment id "TEE ID" and the generated keys and to the mobile device the generated keys;
       the trusted application provider being configured to receive the TEE ID and a hash of the TEE ID computed from the generated keys sent by the mobile device and to authenticate the mobile device through the key director server; upon successful authentication of the mobile device, operating the trusted application provider to transmit the trusted portion of the mobile application including a trusted application to the mobile device; and the mobile device being configured to install the trusted portion of the mobile application on the mobile device thereby providing a trusted execution environment; and install the trusted portion of the mobile application on the mobile device thereby providing a trusted execution environment.

2. The method for securing the mobile application for execution on the mobile device according to claim 1, wherein the non-trusted portion of the mobile application comprises:

a client application executable in a rich execution environment of the mobile device; and a trusted application interpreter for an instruction set in which trusted applications may be implemented.

3. The method for securing the mobile application execution on the mobile device according to claim 2, wherein the trusted application is implemented in the instruction set interpretable by the trusted application interpreter.

4. The method for securing the mobile application execution on the mobile device according to claim 2, wherein the keys associated with the mobile application include a whitebox key "WBC key" and an initial pin encryption key "IPEK" and wherein the method further comprises encrypting the IPEK using the WBC key prior to transmitting the keys associated with the mobile application to the mobile device and wherein the encrypted version of the IPEK is transmitted to the mobile device.

5. The method for securing the mobile application for execution on the mobile device according to claim 4, wherein the trusted portion of the mobile application is encrypted with a session key generated from the initial pin encryption key "IPEC" before transmission by the trusted server provider to the mobile device.

6. The method for securing the mobile application for execution on the mobile device according to claim 1, wherein the non-trusted portion of the mobile application includes an application program interface implementing functionality emulating a hardware implementation of a trusted execution environment.

7. The method for securing the mobile application for execution on the mobile device according to claim 1, further comprising:

associating the trusted application with a trusted secure storage; and storing an initial random secret in secure storage of the mobile device; and on each access of data in the secure storage of the trusted application, generating a secure storage data key "TA_SK" for encrypting data stored in the trusted secure storage associated with the trusted application using an initial random secret "IRS", a device finger print, and a unique id "UUID" for the trusted application.

8. The method for securing the mobile application execution on the mobile device according to the claim 1, further comprising:

during the execution of a trusted application:

determining a one-time runtime key associated with that particular execution of the trusted application;

when storing a quantity into the runtime memory used by the trusted application during that particular execution of the trusted application, masking the quantity using the one-time runtime key; and when retrieving a quantity from the runtime memory used by the trusted application during that particular execution of the trusted application, unmasking the quantity using the one-time runtime key.

9. The method for securing the mobile application for execution on the mobile device according to the claim 1, further comprising:

on a first run of a trusted application having a compiled form for execution or interpretation, computing a first value based on the compiled form of the trusted application and storing that value based on the compiled form of the trusted application;

upon subsequent executions of the trusted application, performing the same computation based on the compiled form of the trusted application to produce a second value based on the compiled form of the trusted application, comparing the first value and a second value, and take a corrective action when the first value and the second values are not the same.

10. The method for securing the mobile application for execution on the mobile device according to claim 1, further comprising defending against a potential time-shift attack by:

determining a first expected execution time for particular instructions of the mobile application on initial execution of the software trusted execution environment;

storing the first expected execution time for said particular instructions;

during subsequent execution of the software trusted execution environment: tracking a current instruction count;

periodically fetching the system clock;

computing a second expected execution time from the current instruction count;

comparing the second expected execution time against the first expected execution time for the current instruction count; and when the comparison indicates an unacceptable deviation, taking a corrective action.

11. The method for securing the mobile application for execution on the mobile device according to claim 10, wherein the particular instructions are calls to functions of an application program interface.

12. The method for securing the mobile application for execution on the mobile device according to claim 1, further comprising:

amending a critical portion of a trusted application with a dummy code section that has a plurality of loops each of which may be executed as a short loop or as a long loop;

assigning a plurality of inspection points in the dummy code section and adjacent to said critical portion of the trusted application;

on execution of the trusted application determining an execution path through the dummy code wherein the execution path executes a defined number of short and long loops;

determining an expected arrival times for each inspection point; and upon arrival of an inspection point, comparing an actual arrival time against the expected arrival time of the inspection point and taking a corrective action when deviation between the actual arrival time of the inspection point and the expected arrival time of the inspection point is beyond a predetermined threshold.

* * * * *